US009332072B2

(12) United States Patent
Hui et al.

(10) Patent No.: US 9,332,072 B2
(45) Date of Patent: May 3, 2016

(54) MAINTAINING DISTRIBUTION-NETWORK-WIDE TIME SYNCHRONIZATION IN SMART GRID DEVICES

(71) Applicant: Cisco Technology, Inc., San Jose, CA (US)

(72) Inventors: Jonathan W. Hui, Belmont, CA (US); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 267 days.

(21) Appl. No.: 14/184,820

(22) Filed: Feb. 20, 2014

(65) Prior Publication Data
US 2015/0237130 A1    Aug. 20, 2015

(51) Int. Cl.
G06F 15/16     (2006.01)
H04L 29/08     (2006.01)
H02J 13/00     (2006.01)
G06F 1/12      (2006.01)

(52) U.S. Cl.
CPC .............. *H04L 67/1095* (2013.01); *G06F 1/12* (2013.01); *H02J 13/0093* (2013.01); *H04L 67/12* (2013.01)

(58) Field of Classification Search
USPC .................................................. 709/200, 248
See application file for complete search history.

(56) References Cited

U.S. PATENT DOCUMENTS

| 5,325,404 | A  |   | 6/1994  | Bigey et al. |
| 6,584,535 | B1 |   | 6/2003  | Ouellet et al. |
| 7,139,923 | B1 |   | 11/2006 | Chapman et al. |
| 7,469,328 | B1 |   | 12/2008 | Mak et al. |
| 7,818,457 | B1 | * | 10/2010 | Flood .................... H04L 12/403 370/503 |
| 2005/0182856 | A1 | * | 8/2005  | McKnett .................. G06F 1/14 709/248 |
| 2007/0109959 | A1 |   | 5/2007  | Koren et al. |
| 2014/0292204 | A1 | * | 10/2014 | Potucek ............ H05B 33/0842 315/134 |

OTHER PUBLICATIONS

Winter, et al., "RPL: IPv6 Routing Protocol for Low-Power and Lossy Networks", Request for Comments 6550, Mar. 2012, 157 pages, Internet Engineering Task Force Trust.

* cited by examiner

*Primary Examiner* — El Hadji Sall
(74) *Attorney, Agent, or Firm* — Parker Ibrahim & Berg LLC; James M. Behmke; Stephen D. LeBarron (57) ABSTRACT

In one embodiment, an alternating circuit (AC) power connected node in a shared-media communication network (with knowledge of a current time) determines a time value of a particular zero-crossing event of the AC power, and sends a message to a neighbor node indicating the time value of the particular zero-crossing event to allow the neighbor node to synchronize its time by coordinating the time value to its detection of the particular zero-crossing event. In another embodiment, the neighboring node determines one or more local zero-crossing events of the AC power, such that upon receiving the message indicating a correct time value of the particular zero-crossing event, the neighboring node can synchronize its local time a current time by matching one of the one or more local zero-crossing events to the particular zero-crossing event and assigning the correct time value to the matched local zero-crossing event.

24 Claims, 10 Drawing Sheets

MAINTAINING DISTRIBUTION-NETWORK-WIDE TIME SYNCHRONIZATION IN SMART GRID DEVICES

TECHNICAL FIELD

The present disclosure relates generally to computer networks, and, more particularly, to maintaining distribution-network-wide time synchronization in smart grid device.

BACKGROUND

Distribution-network-wide time synchronization is an important service for Smart Grid devices, such as devices that are part of an advanced metering infrastructure (AMI). At the link layer, network-wide time synchronization may be used to establish and maintain frequency-hopping and/or time-division multiplex schedules between devices. Existing systems must periodically exchange synchronization messages to correct for clock drift that occurs due to crystal inaccuracies and time-varying environmental factors. Because link-layer protocols typically require synchronization on the order of 10 ms error, such systems need to exchange messages fairly frequently.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an alternating circuit (AC) power connected node in a shared-media communication network (with knowledge of a current time) determines a time value of a particular zero-crossing event of the AC power, and sends a message to a neighbor node indicating the time value of the particular zero-crossing event to allow the neighbor node to synchronize its time by coordinating the time value to its detection of the particular zero-crossing event.

According to one or more additional embodiments of the disclosure, the neighboring node determines one or more local zero-crossing events of the AC power, such that upon receiving the message indicating a correct time value of the particular zero-crossing event, the neighboring node can synchronize its local time a current time by matching one of the one or more local zero-crossing events to the particular zero-crossing event and assigning the correct time value to the matched local zero-crossing event.

Description

A computer network is a geographically distributed collection of nodes interconnected by communication links and segments for transporting data between end nodes, such as personal computers and workstations, or other devices, such as sensors, utility meters, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, in particular, are a specific type of network having spatially distributed autonomous devices such as sensors, actuators, etc. For example, sensor networks, such as for "Smart Grid" and "Smart Cities" (e.g., for Advanced Metering Infrastructure or "AMI" applications), may cooperatively monitor physical or environmental conditions at different locations, such as, e.g., energy/power consumption, resource consumption, etc. Another type of smart object includes actuators, e.g., responsible for turning on/off an engine or perform any other actions. Generally, smart object networks may include any type of device that is able to communicate information on a computer network, such as household appliances (air conditioners, refrigerators, lights, etc.), industrial devices (heating, ventilating, and air conditioning (HVAC), pumps, motors, etc.), and other "smart" devices.

That is, smart object networks are typically interconnected by a communication network, such as a wireless network, though wired connections are also available, and may often consist of wireless nodes in communication within a field area network (FAN). For instance, each smart device (node) in a smart object network may generally be equipped with a radio transceiver or other communication port, a microcontroller, and an energy source, such as a battery (or, in particular to the embodiments herein, a distribution grid power source). Typically, size and cost constraints on sensor nodes result in corresponding constraints on resources such as energy, memory, computational power and bandwidth. Correspondingly, a reactive routing protocol may, though need not, be used in place of a proactive routing protocol for sensor networks.

Figure 1:
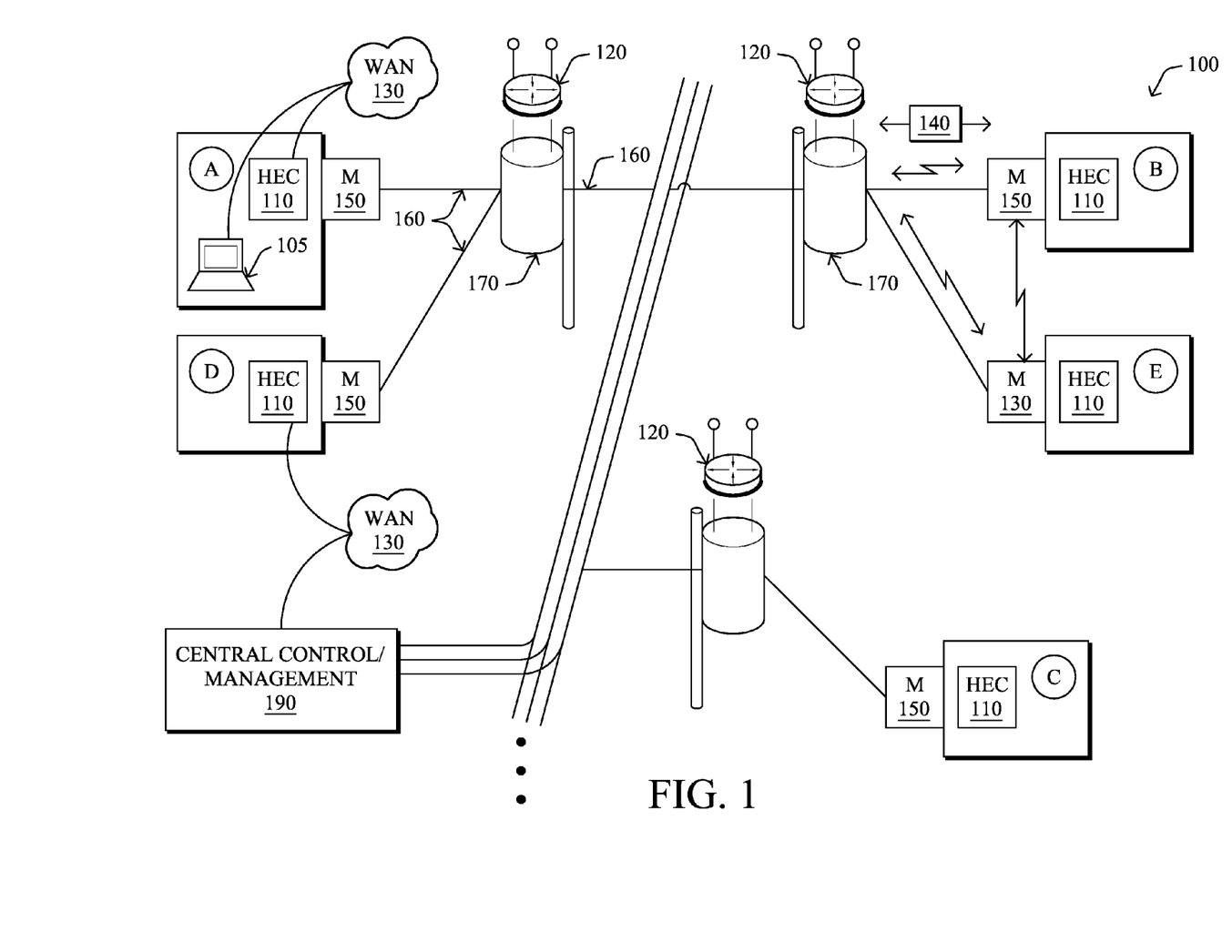
FIG. 1 illustrates an example network of devices shown with various communication and powering configurations.

FIG. 1 is a schematic block diagram of an example simplified network 100 of devices illustratively comprising various communicating and non-communicating devices. For example, power-lines 160 may bring electrical grid power from respective transformers 170 into homes/businesses/etc., generally via a meter 150. In addition, "pole-top" routers 120 may communicate data packets 140 (e.g., traffic and/or messages) with other communicating nodes/devices of the network 100. For instance, the links between the devices may be wired links (e.g., for power-line communication) or may comprise a wireless communication medium. A home energy controller (HEC) 110 or other energy controller may be present at certain locations, and may be in communication with the meters 150, pole-top routers 120, or else directly to another computer network, e.g., WAN 130, similar to conventional computers 105. In addition, a centralized control center or management center 190 may be present in the network 100, such as at an electrical grid company's centralized location, and may be in communication over power-lines 160 and through WAN 130.

Those skilled in the art will understand that any number of nodes, devices, links, etc., as well as any different (and suitable) type of nodes, devices, links, etc., may be present in the network, and that the view shown herein is for simplicity and is not meant to limit the scope of the embodiments herein. In fact, those skilled in the art will appreciate that countless arrangements of power grid components and communicating devices may be established.

As noted above, electric power is generally transmitted from generation plants to end users (industries, commercial, residential, etc.) via a transmission grid consisting of a network of power stations, transmission circuits, and substations interconnected by power lines. From the transmission grid, power may then be distributed to end users via a distribution system. Once at the end users, electricity can be used to power any number of devices. The transmission and distribution of alternating-current (AC) electric power to the end users most frequently takes the form of polyphase electric power, a common form of which being three-phase electric power. For smaller customers (e.g., households) usually a single phase is taken to the property. For larger installations (large houses, buildings), all three phases may be taken to a distribution panel, from which both single and multi (two or three-phase) circuits may be fed.

Figure 2:
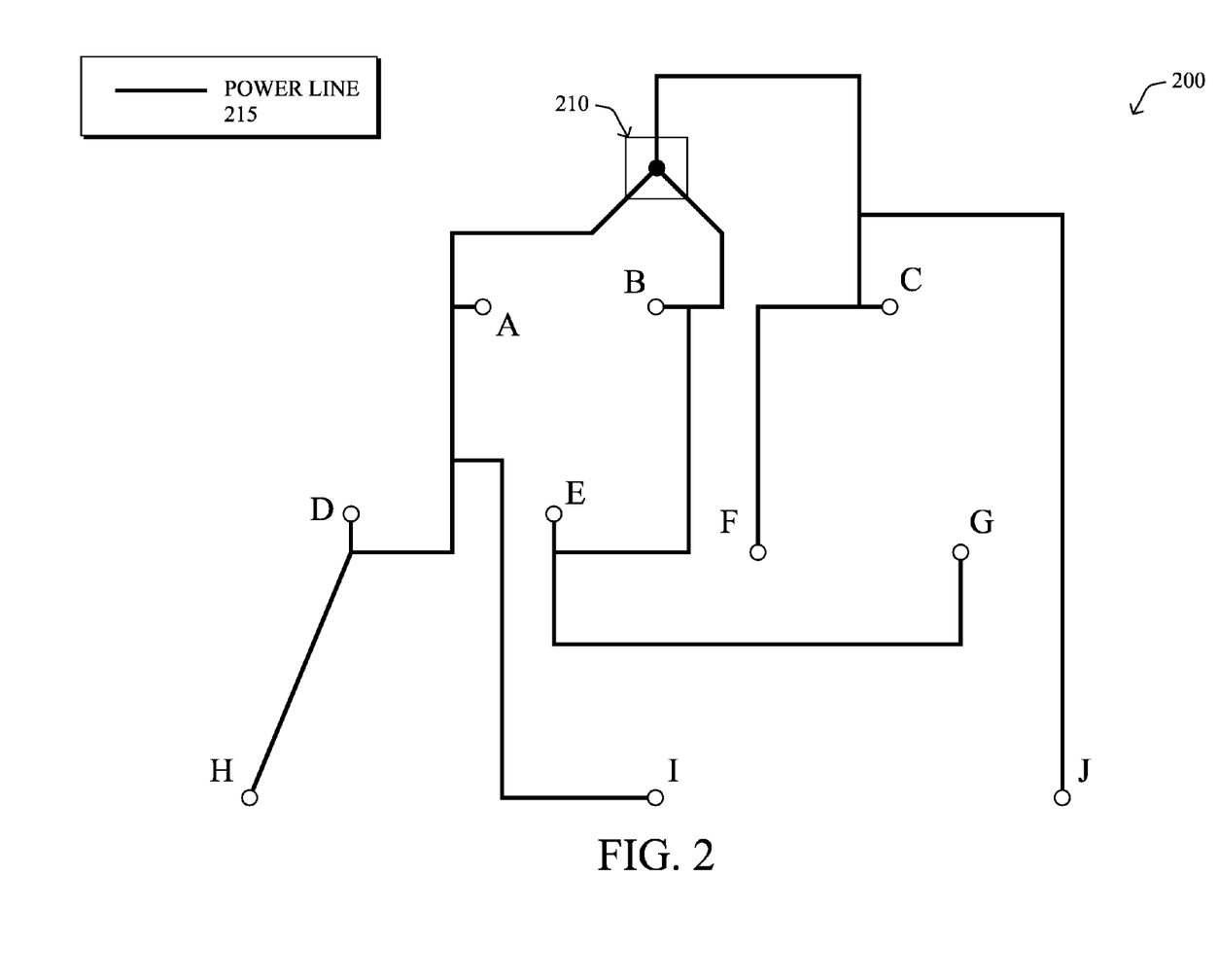
FIG. 2 illustrates an example electric distribution system.

FIG. 2 illustrates a vastly simplified view of an example electric power transmission and distribution grid 200 to the example devices of FIG. 1, above. For instance, a distribution center 210 supplies electricity over a plurality of power lines 215 (e.g., power-lines 160) to the devices at locations "A" through "J".

Figure 3:
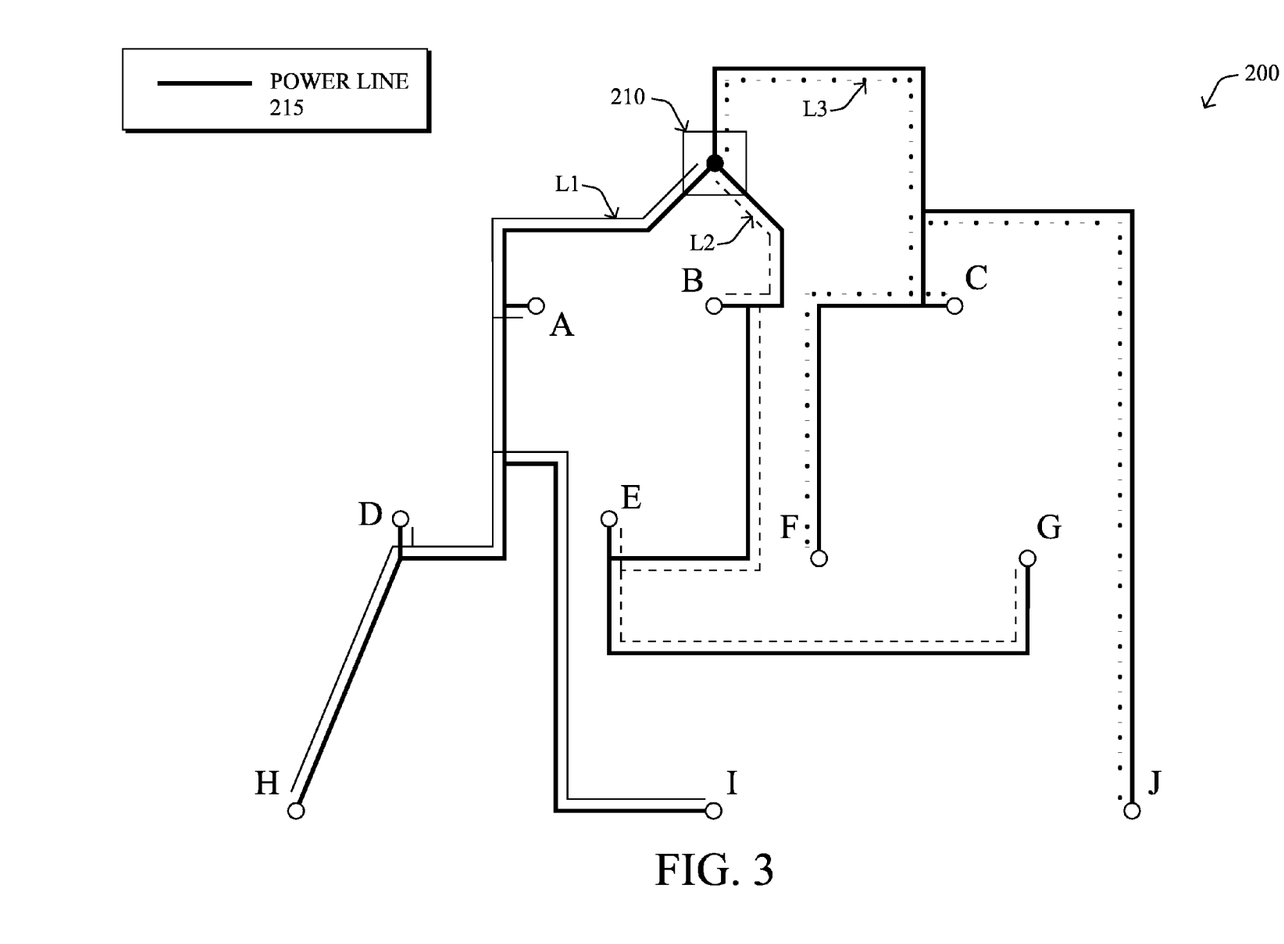
FIG. 3 illustrates an example polyphase electric distribution if the system shown in FIG. 2.

In the embodiments herein, the supplied electricity may be part of a polyphase source system, where a plurality of phases (e.g., three) are transmitted onto the lines 215 to the devices, such that each device is generally attached to a particular phase of the electric grid. As shown in FIG. 3, therefore, electrical power of three phases, L1, L2, and L3, is supplied to the locations A-J (a neutral/ground may be shared by the phases). Notably, as mentioned above, the view shown herein is vastly simplified, as each phase may generally be used to power entire buildings, neighborhoods, etc., and may also supply power to many (e.g., tens, hundreds, thousands) of devices within those establishments. Also, while the view shown herein is generally arbitrarily connected, phase-based distribution grid topologies generally result in "clusters" of like-phased devices (e.g., those within the buildings, neighborhoods, etc.).

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built based on an Objective Function (OF). The role of the Objective Function is generally to specify rules on how to build the DAG (e.g. number of parents, backup parents, etc.).

Figure 4:
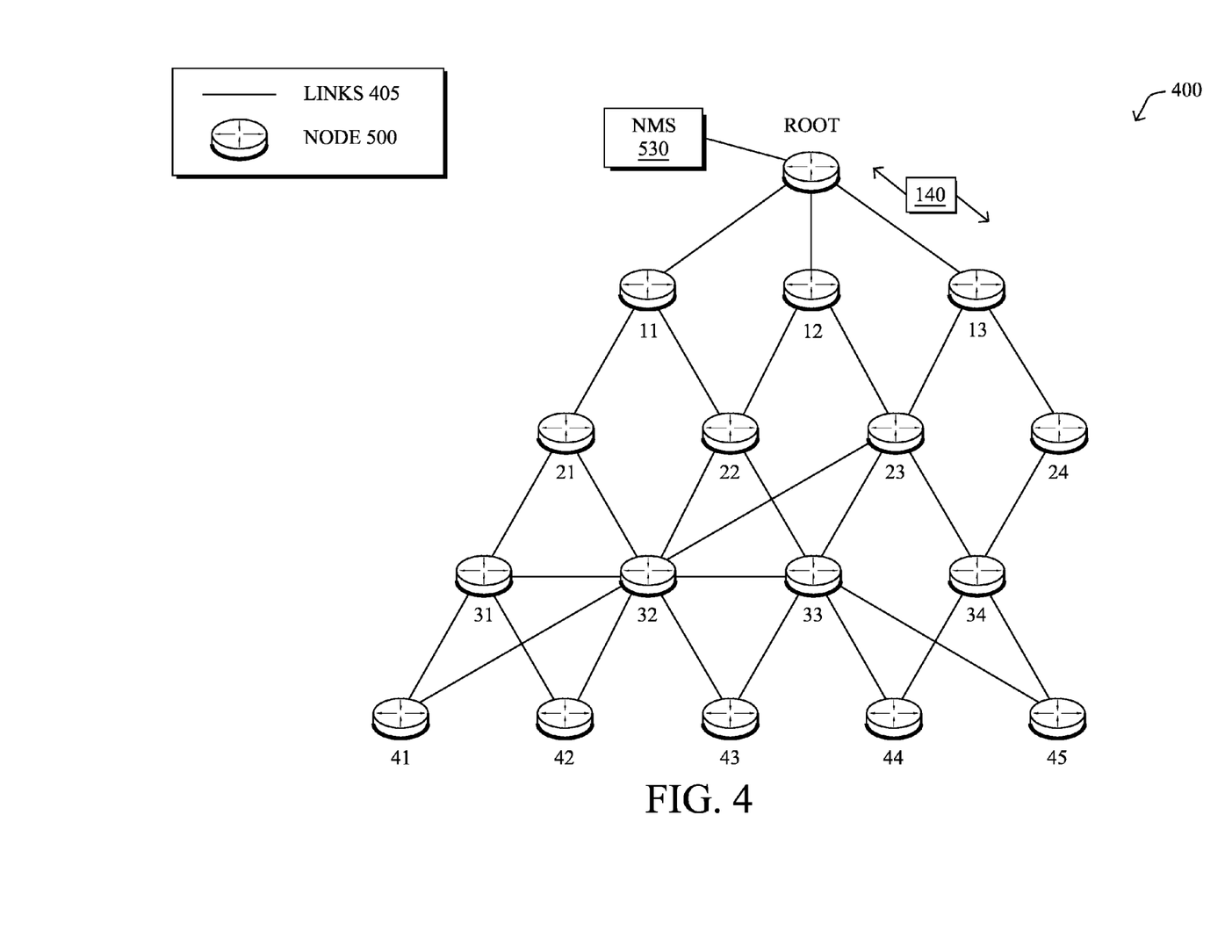
FIG. 4 illustrates an example communication network topology.

FIG. 4 is a schematic block diagram of an example topological view of certain devices 500 (e.g., labeled as shown, "root," "11," "12," ... "45," and described in FIG. 5 below) within a computer network 400, such as smart grid AMI devices within the network 100 of FIG. 1 above, shown within an example routing communication topology. The devices 500 may be interconnected by various methods of communication. For instance, the links 405 may be wired links or shared media (e.g., wireless links, PLC links, etc.) where certain nodes 500, such as, e.g., routers, sensors, computers, etc., may be in communication with other nodes 500, e.g., based on distance, signal strength, current operational status, location, etc., sending packets/frames 140 (as in FIG. 1 above). Those skilled in the art will understand that any number of nodes, devices, links, etc. may be used in the computer network, and that the view shown herein is for simplicity. For example, certain network management devices/servers (e.g., NMS 430), may also be in communication with the topology 400. Also, those skilled in the art will further understand that while the network is shown in a certain orientation, particularly with a "root" node, the network 400 is merely an example illustration that is not meant to limit the disclosure.

Figure 5:
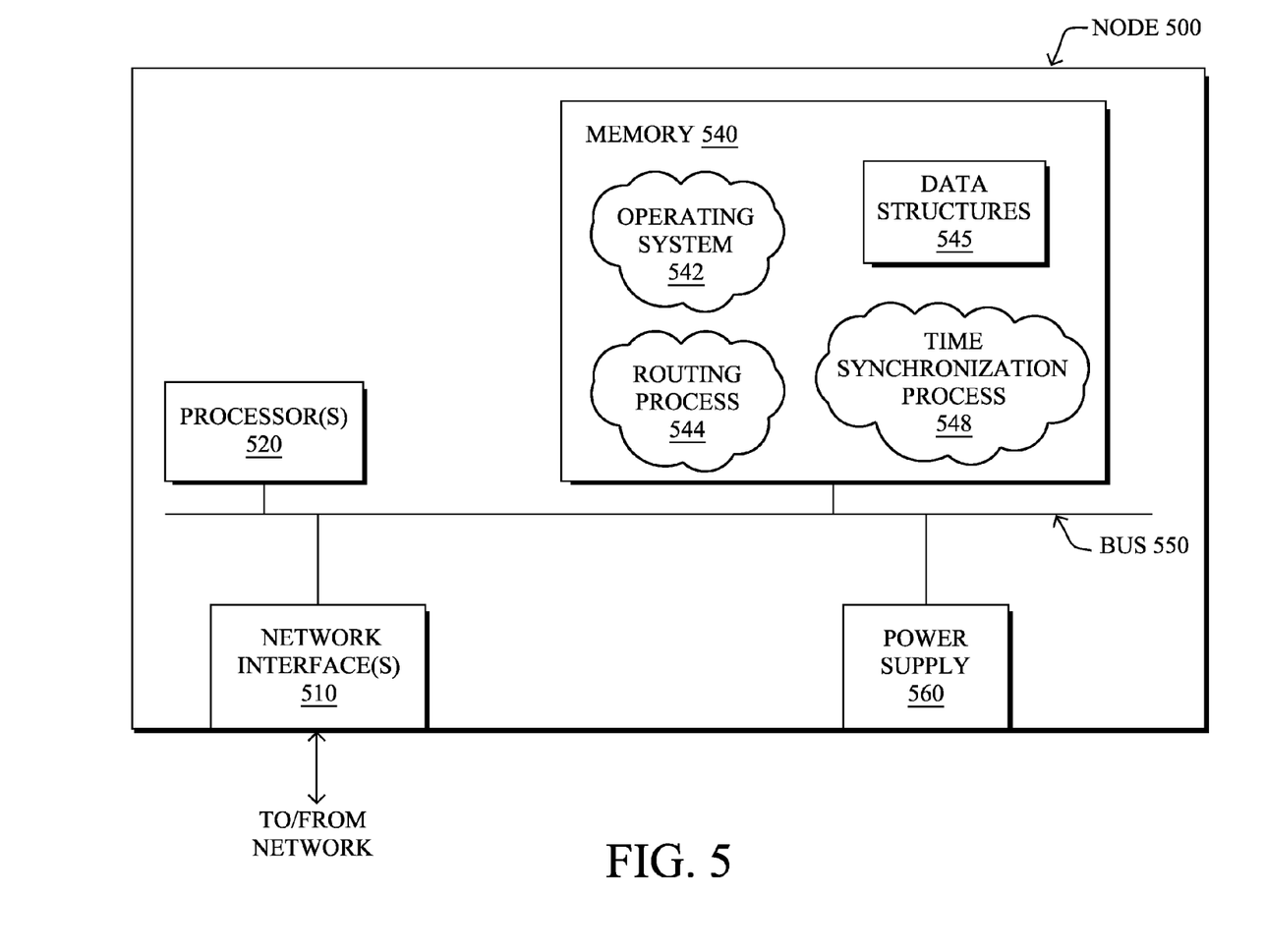
FIG. 5 illustrates an example network device/node.

FIG. 5 is a schematic block diagram of an example node/device 500 that may be used with one or more embodiments described herein, e.g., as any of the nodes shown in FIG. 4 above. The device may comprise one or more network interfaces 510 (e.g., wired, wireless, PLC, etc.), at least one processor 520, and a memory 540 interconnected by a system bus 550, as well as a power supply 560 (e.g., an alternating circuit (AC) plug-in power supply).

The network interface(s) 510 contain the mechanical, electrical, and signaling circuitry for communicating data over links 405 coupled to the network 400. The network interfaces may be configured to transmit and/or receive data using a variety of different communication protocols. Note, further, that the nodes may have two different types of network connections 510, e.g., wireless and wired/physical connections, and that the view herein is merely for illustration. Also, while the network interface 510 is shown separately from power supply 560, for PLC the network interface 510 may communicate through the power supply 560, or may be an integral component of the power supply. In some specific configurations the PLC signal may be coupled to the power line feeding into the power supply.

The memory 540 comprises a plurality of storage locations that are addressable by the processor 520 and the network interfaces 510 for storing software programs and data structures associated with the embodiments described herein. Note that certain devices may have limited memory or no memory (e.g., no memory for storage other than for programs/processes operating on the device and associated caches). The processor 520 may comprise hardware elements or hardware logic adapted to execute the software programs and manipulate the data structures 545. An operating system 542, portions of which are typically resident in memory 540 and executed by the processor, functionally organizes the device by, inter alia, invoking operations in support of software processes and/or services executing on the device. These software processes and/or services may comprise routing process/services 544, and an illustrative time synchronization process 548, as described herein. Note that while time synchronization process 548 is shown in centralized memory 540, alternative embodiments provide for the process or portions of the process to be specifically operated within the network interfaces 510 (or power supply 560).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 544 contains computer executable instructions executed by the processor 520 to perform functions provided by one or more routing protocols, such as proactive or reactive routing protocols as will be understood by those skilled in the art. These functions may, on capable devices, be configured to manage a routing/forwarding table (a data structure 545) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 544 may consist solely of providing mechanisms necessary for source routing techniques. That is, for source routing, other devices in the network can tell the less capable devices exactly where to send the packets, and the less capable devices simply forward the packets as directed.

Time Synchronization

As noted above, distribution-network-wide time synchronization is an important service for Smart Grid devices, such as devices that are part of an advanced metering infrastructure (AMI). At the link layer, network-wide time synchronization may be used to establish and maintain frequency-hopping and/or time-division multiplex schedules between devices. Existing systems must periodically exchange synchronization messages to correct for clock drift that occurs due to crystal inaccuracies and time-varying environmental factors. Because link-layer protocols typically require synchronization on the order of 10 ms error, such systems need to exchange messages fairly frequently. By using a common external signal to maintain time synchronization (e.g., the alternating current (AC) signal), devices no longer need to incur the overhead of exchanging synchronization messages. At the application layer, distribution-network-wide time sync makes it possible to correlate multiple events across different devices in time. Distribution-network-wide time synchronization is required to support a number of Smart Grid applications, including Integrated Volt-Var Control (IVVC) and closed-form switching to address flow control issues.

Across a single electric distribution network, the AC power line provides a common signal source that is phase-coherent. Including a zero-crossing detector in Smart Grid devices makes it possible for each device to synchronize their clocks to the AC signal. However, the AC signal across a single electric distribution network does have significant challenges. First is that the AC line frequency is time varying, where the frequency itself can signal instabilities and support automatic load balance control. The utility may adjust the AC line frequency to maintain a specified average over longer time windows. Note, however, that these differences in AC line frequency do not affect time synchronization between devices on the same distribution network since the frequency shift affects all devices in the same way. AC frequency variation only becomes problematic when trying to synchronize the network with an external time source.

Second is that the AC voltage phase (what affects the timing of zero crossings) is not constant across a single electric distribute network. In some cases, the Smart Grid AMI end-points may be separated by grid components that add a phase shift to the AC signal. For example, the phase shift through a transformer may involve a +/−180 degree phase shift between the primary and secondary and an additional +/−30 degree phase shift, depending on wiring. Furthermore, the AC line phase can vary as much as 8 degrees over the length of a single feeder. These phase shifts must be accounted for in a time-synchronization protocol otherwise the accuracy is dependent on the link-layer (e.g., PLC or RF) time-stamping capabilities. As a result, with 8 degrees at 60 Hz, it should be possible to maintain network-wide time synchronization to within 370 us.

A goal of the techniques herein is to provide a method for establishing and maintaining network-wide time synchronization for Smart Grid (e.g., AMI) devices. As described below, the techniques have devices communicate the current time in a message, having the receiver correlate the current time with zero-crossings in the AC signal, and thus maintaining time synchronization using the AC signal.

Said differently, the techniques herein establish and maintain distribution-network-wide time synchronization in a Smart Grid network, generally through (i) assigning time values to a reference phase's zero-crossing events, (ii) having a device synchronize with a neighbor by sending a time sync message that includes the time value of a recent zero-crossing event and a time offset from that event, (iii) having a receiver assign time values to zero-crossing events based on the received message's offset, (iv) having devices attached to different phases maintain a virtual clock that has a phase-offset set to the expected phase-offset from the reference phase and assigning time values to the virtual zero-crossing events, (v) maintaining a virtual clock for devices connected to the same distribution phase but experience a phase offset due to grid components (e.g., transformer) and propagating such phase offsets, and (vi) having all devices use distribution-network-wide time and only mapping to global time (e.g., GMT) when needed by the application.

Illustratively, the techniques described herein may be performed by hardware, software, and/or firmware, such as in accordance with the time synchronization process 548, which may contain computer executable instructions executed by the processor 520 to perform functions relating to the techniques described herein, e.g., in conjunction with the power supply 560 and/or network interfaces 510.

Operationally, to establish and maintain distribution-network-wide time-synchronization for smart grid devices, one or more devices are configured as a root time source (i.e., have knowledge of the current/correct time), and are authoritative in seeding the network time distribution. Whereas existing time-sync mechanisms for LLNs focus on having a sender communicate the current time and eliminating any time delay incurred in communicating the message, the techniques herein rely on communicating the time value of a recent (e.g., most recent) zero-crossing. For instance, as long as the communication delay remains less than the AC signal period, all synchronization errors related to communication delay can be eliminated.

Figure 6:
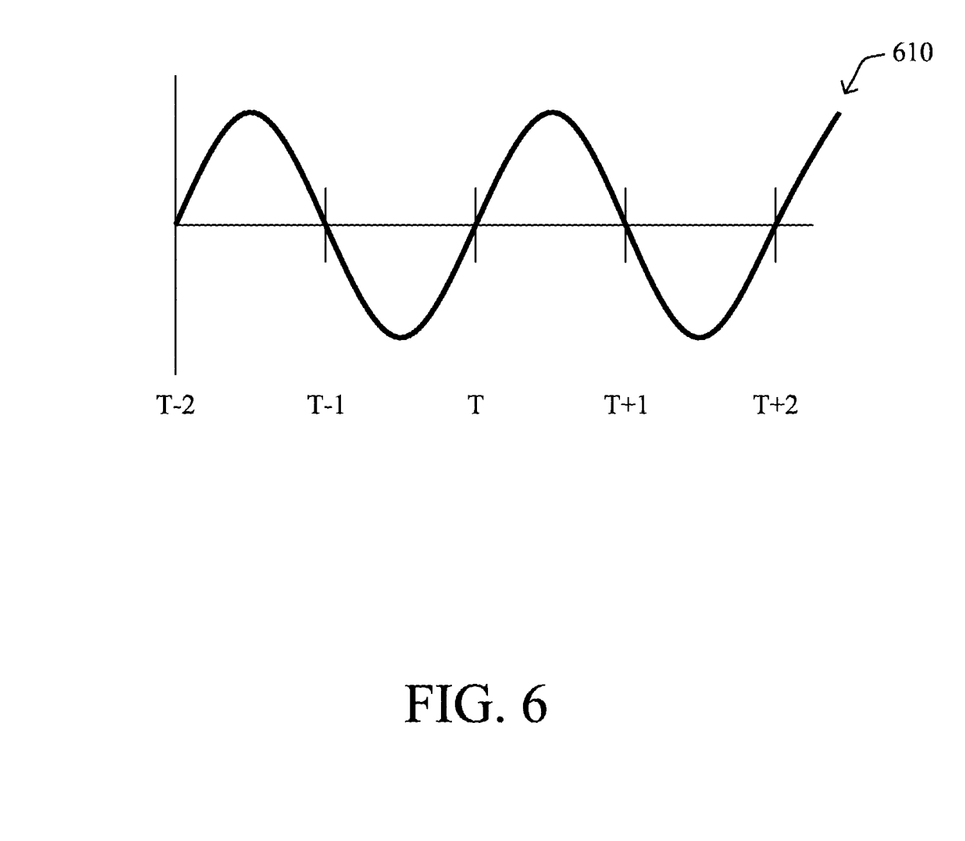
FIG. 6 illustrates zero-crossing detection.
Figure 7:
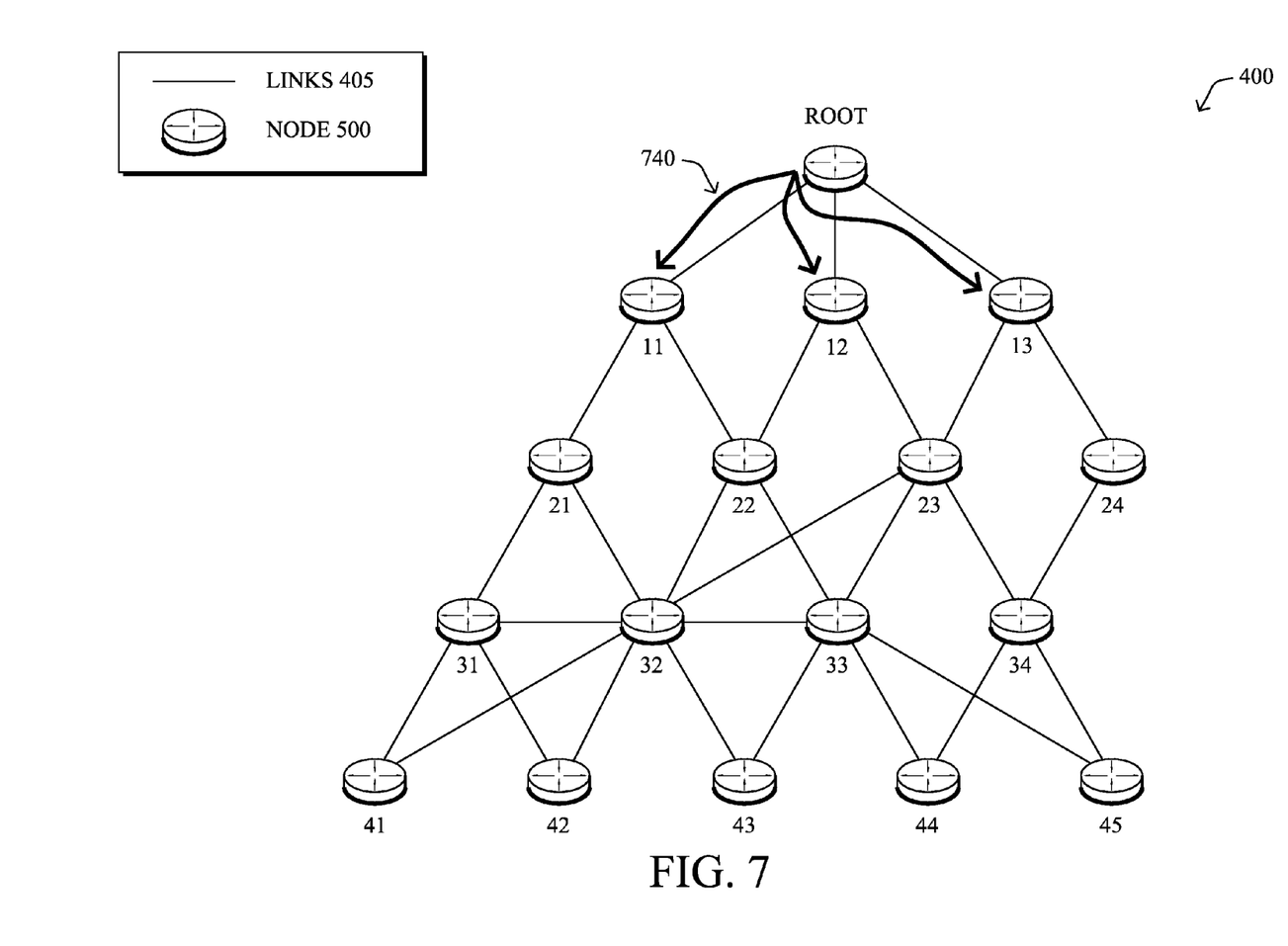
FIG. 7 illustrates an example message passing.

A first component of the techniques herein involves synchronizing time between two devices on the same phase without any significant phase shift. In this situation, as illustrated in FIG. 6, each zero-crossing event, i.e., when the AC signal 610 passes through zero, is assigned a time value, where a sequence of zero-cross events may be represented as . . . , T−2, T−1, T, T+1, T+2, . . . . As shown in FIG. 7, a device that has knowledge of the current time (e.g., the root node, or any seed node) transmits a message 740 (e.g., unicast, multicast, broadcast, etc.) that includes (i) the time value of the most recent zero-crossing event and optionally (ii) the time offset since that zero-crossing event. Note that the time offset should have higher precision than the AC signal, and should be enough to account for communication delays and jitter. Note that the time offset may be omitted if the message is transmitted at an offset known to both the sender and receiver. Upon receiving the message, the receiver uses the time offset to determine which zero-crossing event the time value applies and assigns all subsequent zero-crossing events based on that event.

Figure 8:
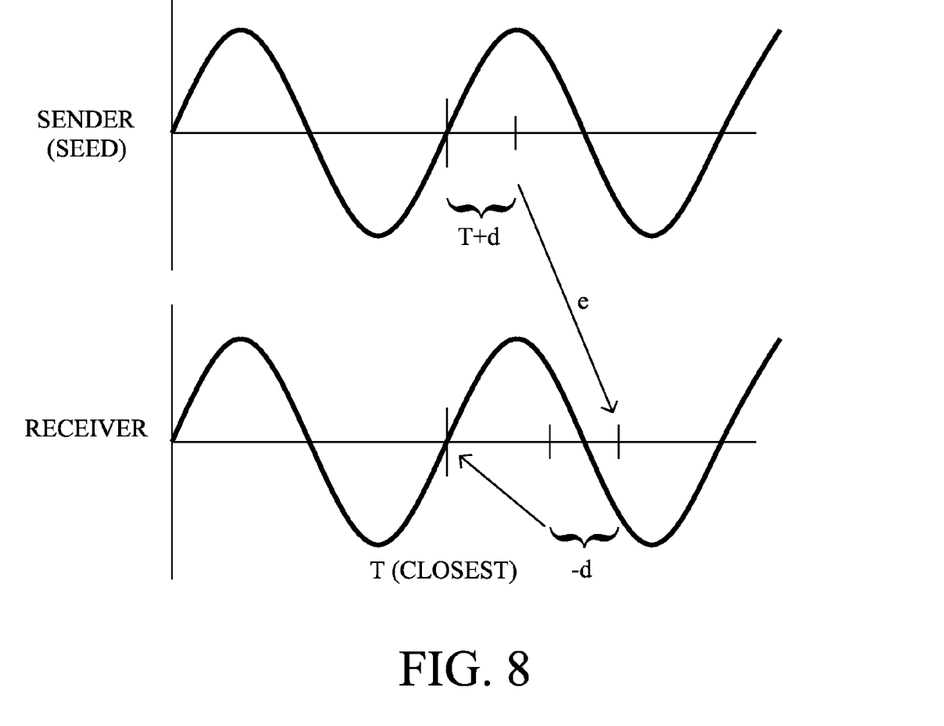
FIG. 8 illustrates an example time synchronization.

For example, with reference to FIG. 8, a sender (e.g., root node) transmits at time T+d a message to a neighboring node (e.g., node 11) that contains (i) zero-cross time value T and (ii) time offset d. The receiver processes the message at time T+d+e, where e accounts for (possibly non-deterministic) processing delays. The receiver determines the closest zero-crossing event by subtracting d, thus eliminating e. In other words, synchronizing on the zero-crossing events effectively eliminates any timing errors introduced by the link-layer.

Note that the sender/receiver may communicate using any method available to them. For example, devices may communicate timing information using IEEE 1901.2 PLC, IEEE 802.15.4g RF, etc. The only constraint is that the range of timing errors (e) remain less than the period of the AC signal, else the elimination of processing delays would need to be accounted for by the time offset relayed (e.g., d plus an estimated e).

Figure 9:
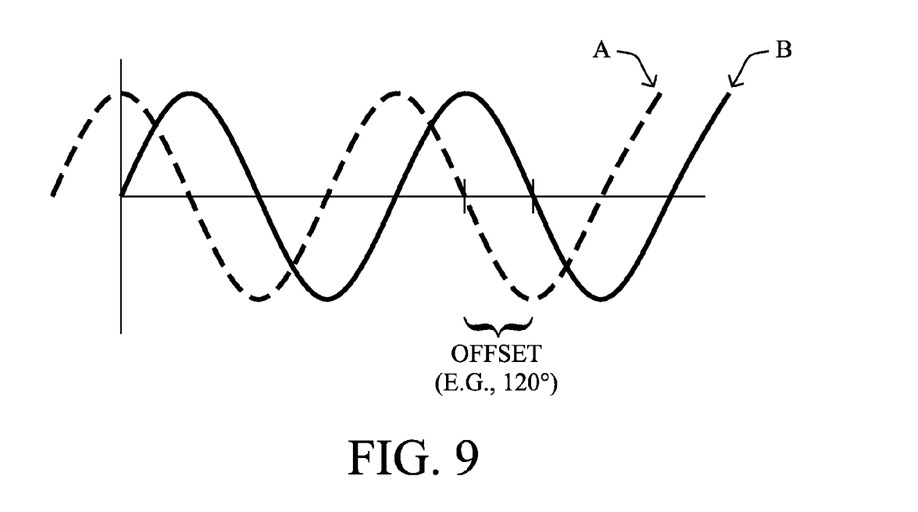
FIG. 9 illustrates an example phase shifting.

A second component of the techniques herein involves synchronizing time between two devices on different phases. For example, techniques outside the scope of the techniques herein may allow devices to determine their relative phase and absolute phase. In a multi-phase system, the absolute time is referenced off a single phase (e.g., Phase A). Devices measuring zero-crossing events on different phases must adjust for this phase difference. In one embodiment, as shown in FIG. 9, a device may maintain a virtual clock that signals zero-crossing events at a phase-offset from the phase it is connected to. For example, if the device is connected to Phase B, it may maintain a virtual clock that signals events at a −120 degree offset to represent zero-crossing events on Phase A. When receiving a time-sync message from the first component, the device then assigns time values to virtual zero-crossing events for Phase A rather than the zero-crossing events on Phase B. Again, because the virtual clock is based on physical zero-crossing events of Phase B, any timing errors introduced by the link-layer are eliminated.

A third component of the techniques herein involves synchronizing time between two devices on the same phase but a grid component (e.g., transformer) introduces a known phase-offset. For example, a transformer may introduce a 180 degree phase shift depending on how the primary side is connected. Additionally, a +/−30 degree phase shift may be introduced depending on the kind of connection (e.g., Delta or Wye) on the primary and secondary sides. By processing the time offset value in the time-sync message, a receiver can determine how the transformer is connected and the resulting phase offset that a transformer introduces (e.g., −30, 0, 30, 180, 180−30, 180+30). Using this information, a device can configure the virtual clock appropriately based on the expected phase offset. Note that this is a generalization of the second component to include constant phase offsets introduced by grid components rather than simply being connected to different phases. To further propagate this phase change to other devices behind the transformer, a phase-offset-from-root may be included in the message. For example, if the phase offset between the primary and secondary feeders is 180 degrees, all devices on the primary feeder will include 0 offset in their messages and all devices on the secondary feeder will include 180 offset in their messages.

In order to propagate the timing information, any existing dissemination mechanism may be used herein. One embodiment may involve having the root/seed device increment a sequence number and receivers only processing messages with higher sequence numbers. Another embodiment, may involve reverse path forwarding along a tree or DAG topology. Either embodiment may utilize unicast and/or broadcast transmissions. In either case, whenever a device receives a "new" message (e.g., when receiving a message with higher sequence number), it uses the time and phase information in the message to assign time values to zero-crossing events as described in the above components.

A fourth component of the techniques herein involves mapping the distribution-network-wide time to global time (e.g., GMT) wherever global time is needed. By having all devices operate on distribution-network-wide time by default, there is no need to propagate new global time values due to frequency variations in the AC signal itself. In other words, devices do not have to fast-forward or rewind the clock that counts based on zero-crossing events. Instead, whenever an application requires the use of global time, it may obtain the mapping between a zero-crossing time value and GMT. This mapping may be maintained locally on the node or by another device.

Notably, the AC signal is subject to fluctuation and DC-bias, and the AC line frequency varies in both the space and time domains. Also, there are a number of techniques to perform zero-crossing detection, the most widely used being Phase Lock Loop (PLL) designs, which use closed-loop control to track the phase and frequency of an input signal. Such methods typically include a low-pass filter for ignoring transient fluctuations and a high-pass filter for removing DC bias from the signal. Existing PLL-based designs can offer a response time on the order of 100 ms and an error within a few ms. However, even while several improvements to the PLL design have been made over time, PLL-based systems suffer from the assumption that the fundamental frequency is relatively constant. Fluctuations in frequency lead to errors in phase estimation. Discrete Fourier Transform (DFT) is another technique for tracking the phase and frequency of an input signal, but also assumes the fundamental frequency is fairly constant. The Smart DFT method is very accurate, but has a response time of 150 ms for a 60 Hz signal and a dynamic frequency range of 50-75 Hz. Zero-Crossing Peak Detection Algorithm (ZCPD) is a method for tracking the amplitude, phase, and frequency of the fundamental component from an input signal. ZCPD provides a number of advantages and operates well in presence of input signal distortion (THD up to 50%), tracks positive/negative frequency ramps as high as 250 Hz/sec, and transient recovery time within 2-4 fundamental cycles.

The jitter introduced by communication and processing delays are typically less than a millisecond even when communicating at the lowest data rate offered by IEEE 1901.2 (e.g., 2.4 kbps). Typical mesh-networking systems synchronize an entire network simply through the communication medium itself. However, synchronization in large-scale (i.e., many hops) networks suffer from error-accumulation, since the synchronization must occur hop-by-hop and propagated to each device. In other words, such systems do not have the benefit of directly accessing a single reference signal. The techniques herein eliminate the synchronization error accumulation by utilizing the AC signal and accounting for phase differences that may be induced by grid components.

Choosing a specific method (e.g. PLL, DFT, ZCPD, etc.) for extracting synchronization information from an AC signal depends on the application of the techniques herein. For instance, a simple PLL-based design may be sufficient for applications that need to establish a relatively stable time base (e.g., a low-pass filter may be used to ignore short-term signal disturbances). A more complex ZCPD design may be used for applications that require closely tracking disturbances in the AC signal, such as for Smart Grid applications that involve fault detection and classification. Again, the benefit of having a single reference signal is the ability to eliminate error accumulation. While the reference signal may itself have some frequency variation, it affects all devices on the same electric phase in the same way.

Figure 10:
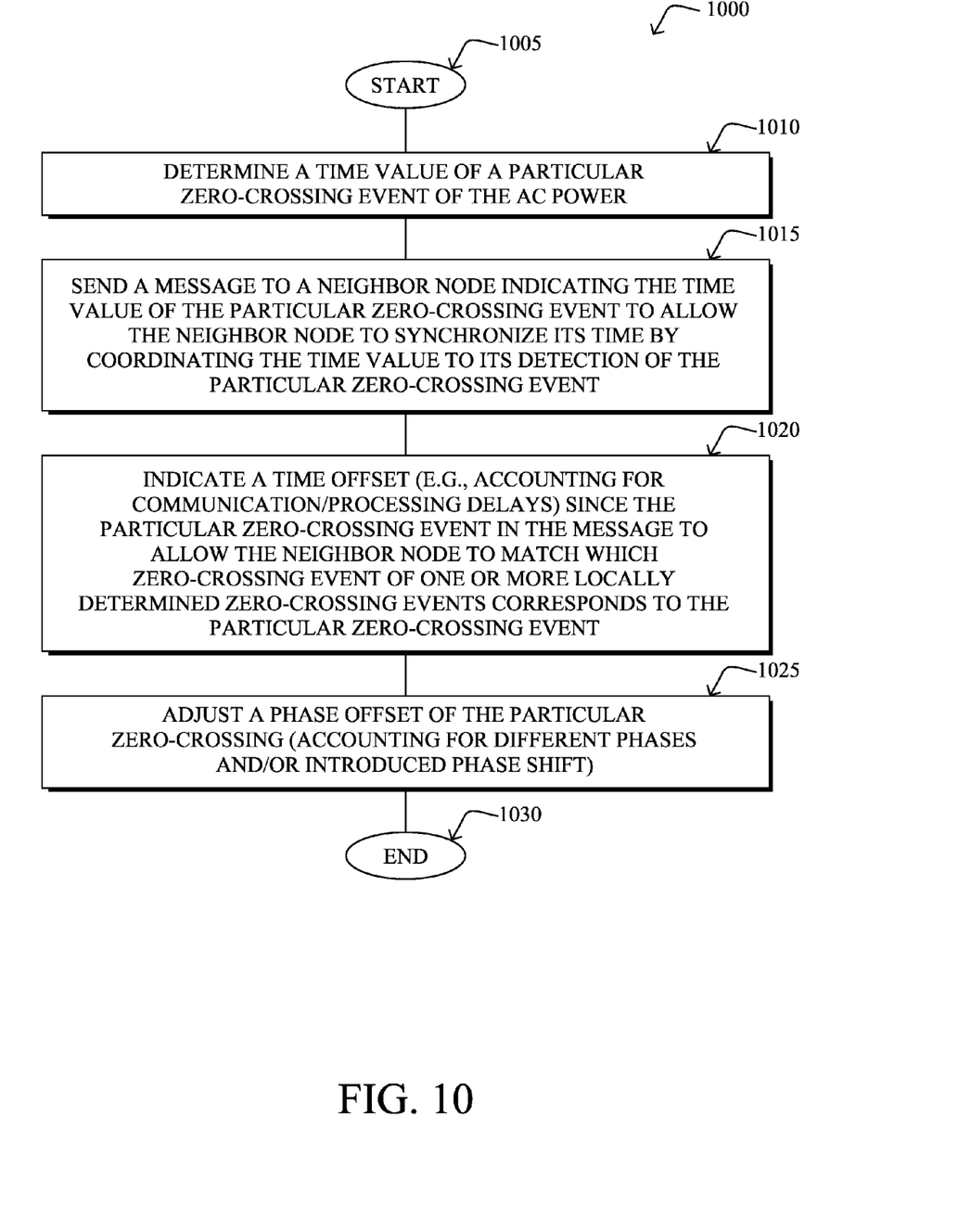
FIG. 10 illustrates an example simplified procedure for maintaining distribution-network-wide time synchronization in smart grid devices, particularly from the perspective of a node with knowledge of the current time.

FIG. 10 illustrates an example simplified procedure 1000 for maintaining distribution-network-wide time synchronization in smart grid devices in accordance with one or more embodiments described herein, particularly from the perspective of a node with knowledge of the current time. The procedure 1000 may start at step 1005, and continues to step 1010, where, as described in greater detail above, an alternating circuit (AC) power connected node in a shared-media communication network with knowledge of a current time determines a time value of a particular zero-crossing event of the AC power. As such, in step 1015, the node sends a message (740) to a neighbor node indicating the time value of the particular zero-crossing event to allow the neighbor node to synchronize its time by coordinating the time value to its detection of the particular zero-crossing event. Optionally, in step 1020, the node may also indicate a time offset (e.g., accounting for communication/processing delays) since the particular zero-crossing event in the message to allow the neighbor node to match which zero-crossing event of one or more locally determined zero-crossing events corresponds to the particular zero-crossing event. Further, as mentioned above (though from the perspective of the receiving device), the sending node may also adjust a phase offset of the particular zero-crossing in step 1025, since the node and neighbor node may be on different phases of a polyphase AC power system (thus the adjusting accounts for the different phases), or else the node and neighbor node are separated by a power grid component that introduces a phase-shift (thus the adjusting accounts for the introduced phase-shift). The illustrative and simplified procedure 1000 may then end in step 1030.

Figure 11:
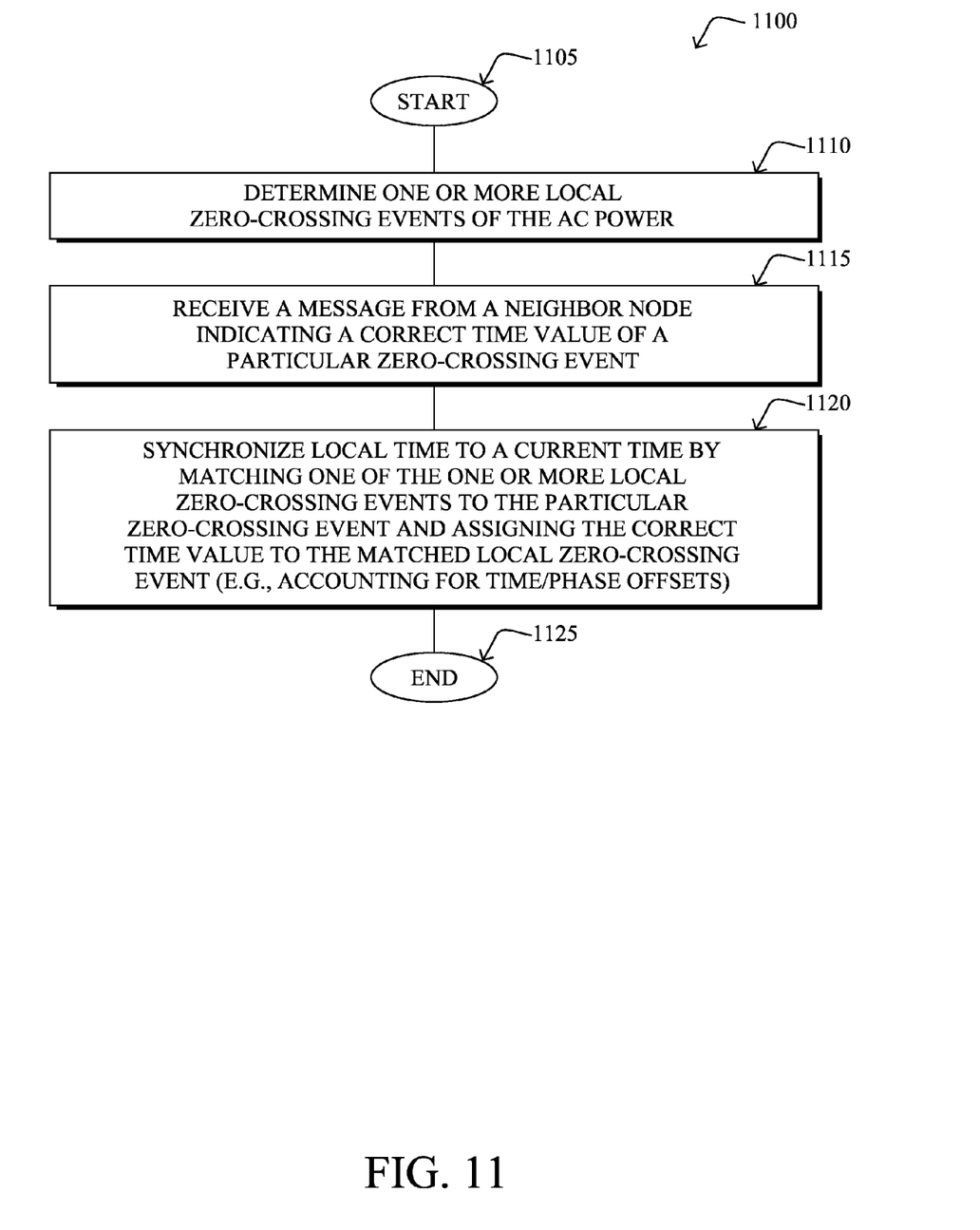
FIG. 11 illustrates an example simplified procedure for maintaining distribution-network-wide time synchronization in smart grid devices, particularly from the perspective of a node that needs to synchronize to the current time.

Additionally, FIG. 11 illustrates an example simplified procedure 1100 for maintaining distribution-network-wide time synchronization in smart grid devices in accordance with one or more embodiments described herein, particularly from the perspective of a node that needs to synchronize to the current time. The procedure 1100 may start at step 1105, and continues to step 1110, where, as described in greater detail above, an AC power connected node in a shared-media communication network determines one or more local zero-crossing events of the AC power. Upon receiving a message (740) from a neighbor node indicating a correct time value of a particular zero-crossing event in step 1115, then in step 1120 the node may synchronize its local time to a current time by matching one of the one or more local zero-crossing events to the particular zero-crossing event and assigning the correct time value to the matched local zero-crossing event. Note that the node may also account for time and/or phase offsets as described above, particularly with reference to steps 1020-1025 of FIG. 10 above (but now from the perspective of the receiving node). The illustrative and simplified procedure may then end in step 1125.

It should be noted that while certain steps within procedures 1000-1100 may be optional as described above, the steps shown in FIGS. 10-11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1000-1100 are described separately, certain steps from each procedure may be incorporated into each other procedure, and the procedures are not meant to be mutually exclusive.

The techniques described herein, therefore, provide for maintaining distribution-network-wide time synchronization in smart grid devices. In particular, the techniques herein provide a method for smart grid (e.g., AMI) devices to establish and maintain accurate network-side time synchronization. Because the AC signal provides a single common time source to all smart grid devices that is accurate, synchronizing time values to the AC signal eliminates any time-synchronization errors that are inherent with existing in-band synchronization techniques (e.g. NTP, FTP, and/or link-layer specific methods). In particular, the techniques herein eliminate any timing errors introduced when sending/receiving messages. In addition, because the techniques herein utilize the network to propagate time values, they may be used in areas where GPS is cost-prohibitive or infeasible due to inadequate GPS signal strength.

Note that the techniques herein do not to use zero-crossings to provide for communication, but instead to provide for synchronizing time between all devices along an electric distribution network, including devices separated by transformers. Furthermore, the techniques herein are agnostic to the actual physical (PHY) technology and may be used with IEEE 1901.2 PLC, IEEE 802.15.4g RF, etc.

As noted above, by communicating zero-crossing time information, neighboring devices can determine the phase difference in AC zero-crossings. The measured phase difference allows devices to determine whether they are on the same phase, a different phase, separated by a transformer, and the kind of transformer that separates them (Wye-Wye, Delta-Wye, Delta-Delta, etc.). Using this phase-differential information and propagating timing information across multiple hops allows devices to maintain a virtual clock that is synchronized with one or more reference device's AC signal zero-crossings. The techniques herein thus provide an in-band method for time synchronization across an entire electric distribution network, for example, for mesh networking technology designed to connect devices across different feeders and transformers.

As also mentioned above, distribution-network-wide time synchronization enables a number of applications. At the application layer, distribution-network-wide time sync makes it possible to correlate multiple events across different devices in time. Distribution-network-wide time sync is required to support a number of Smart Grid applications, including Integrated Volt-Var Control (IVVC) and closed-form switching to address flow control issues. At the link layer, network-wide time sync may be used to establish and maintain frequency-hopping and/or time-division multiplex schedules between devices. Existing systems must periodically exchange synchronization messages to correct for clock drift that occurs due to crystal inaccuracies and time-varying environmental factors. Because link-layer protocols typically require synchronization on the order of 10 ms error, such systems need to exchange messages fairly frequently. By using a common external signal to maintain time synchronization (e.g., the AC signal), devices no longer need to incur the overhead of exchanging synchronization messages.

While there have been shown and described illustrative embodiments that provide for maintaining distribution-network-wide time synchronization in smart grid devices, it is to be understood that various other adaptations and modifications may be made within the spirit and scope of the embodiments herein. For example, the embodiments have been shown and described herein with relation to particular types of networks and/or protocols. However, the embodiments in their broader sense are not as limited, and may, in fact, be used with other types of networks and/or protocols.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining, by an alternating circuit (AC) power connected node in a shared-media communication network with knowledge of a current time, a time value of a particular zero-crossing event of the AC power; and
    sending a message to a neighbor node indicating the time value of the particular zero-crossing event to allow the neighbor node to synchronize its time by coordinating the time value to its detection of the particular zero-crossing event.

2. The method as in claim 1, further comprising:
    indicating a time offset since the particular zero-crossing event in the message to allow the neighbor node to match which zero-crossing event of one or more locally determined zero-crossing events corresponds to the particular zero-crossing event.

3. The method as in claim 2, wherein the time offset accounts for communication delays.

4. The method as in claim 2, wherein the time offset accounts for processing delays.

5. The method as in claim 1, further comprising:
    adjusting a phase offset of the particular zero-crossing.

6. The method as in claim 5, wherein the node and the neighbor node are on different phases of a polyphase AC power system, the adjusting accounting for the different phases.

7. The method as in claim 5, wherein the node and the neighbor node are separated by a power grid component that introduces a phase-shift, the adjusting accounting for the introduced phase-shift.

8. A method, comprising:
determining, by an alternating circuit (AC) power connected node in a shared-media communication network, one or more local zero-crossing events of the AC power;
receiving a message from a neighbor node indicating a correct time value of a particular zero-crossing event; and
synchronizing local time of the node to a current time by matching one of the one or more local zero-crossing events to the particular zero-crossing event and assigning the correct time value to the matched local zero-crossing event.

9. The method as in claim 8, further comprising:
receiving, within the message, an indication of a time offset since the particular zero-crossing event, wherein the node matches which zero-crossing event of the one or more local zero-crossing events corresponds to the particular zero-crossing event based on the time offset.

10. The method as in claim 9, wherein the time offset accounts for communication delays.

11. The method as in claim 9, wherein the time offset accounts for processing delays.

12. The method as in claim 8, further comprising:
adjusting a phase offset of the particular zero-crossing.

13. The method as in claim 12, wherein the node and the neighbor node are on different phases of a polyphase AC power system, the adjusting accounting for the different phases.

14. The method as in claim 12, wherein the node and the neighbor node are separated by a power grid component that introduces a phase-shift, the adjusting accounting for the introduced phase-shift.

15. An apparatus, comprising:
an alternating circuit (AC) power connection;
one or more network interfaces to communicate as a node within a shared-media communication network;
a processor coupled to the network interfaces and configured to execute one or more processes; and
a memory configured to store a process executable by the processor, the process when executed operable to:
determine, with knowledge of a current time, a time value of a particular zero-crossing event of the AC power; and
send a message to a neighbor node indicating the time value of the particular zero-crossing event to allow the neighbor node to synchronize its time by coordinating the time value to its detection of the particular zero-crossing event.

16. The apparatus as in claim 15, wherein the process when executed is further operable to:
indicate a time offset since the particular zero-crossing event in the message to allow the neighbor node to match which zero-crossing event of one or more locally determined zero-crossing events corresponds to the particular zero-crossing event.

17. The apparatus as in claim 16, wherein the time offset accounts for one or both of communication delays and processing delays.

18. The apparatus as in claim 15, wherein the process when executed is further operable to:
adjust a phase offset of the particular zero-crossing, wherein the node and the neighbor node are on different phases of a polyphase AC power system, the adjusting accounting for the different phases.

19. The apparatus as in claim 15, wherein the process when executed is further operable to:
adjust a phase offset of the particular zero-crossing, wherein the node and the neighbor node are separated by a power grid component that introduces a phase-shift, the adjusting accounting for the introduced phase-shift.

20. An apparatus, comprising:
an alternating circuit (AC) power connection;
one or more network interfaces to communicate as a node within a shared-media communication network;
a processor coupled to the network interfaces and configured to execute one or more processes; and
a memory configured to store a process executable by the processor, the process when executed operable to:
determine one or more local zero-crossing events of the AC power;
receive a message from a neighbor node indicating a correct time value of a particular zero-crossing event; and
synchronize local time of the node to a current time by matching one of the one or more local zero-crossing events to the particular zero-crossing event and assigning the correct time value to the matched local zero-crossing event.

21. The apparatus as in claim 20, wherein the process when executed is further operable to:
receive, within the message, an indication of a time offset since the particular zero-crossing event, wherein the node matches which zero-crossing event of the one or more local zero-crossing events corresponds to the particular zero-crossing event based on the time offset.

22. The apparatus as in claim 21, wherein the time offset accounts for one or both of communication delays and processing delays.

23. The apparatus as in claim 20, wherein the process when executed is further operable to:
adjust a phase offset of the particular zero-crossing, wherein the node and the neighbor node are on different phases of a polyphase AC power system, the adjusting accounting for the different phases.

24. The apparatus as in claim 20, wherein the process when executed is further operable to:
adjust a phase offset of the particular zero-crossing, wherein the node and the neighbor node are separated by a power grid component that introduces a phase-shift, the adjusting accounting for the introduced phase-shift.

* * * * *